United States Patent
Gu et al.

(10) Patent No.: US 12,338,762 B2
(45) Date of Patent: Jun. 24, 2025

(54) EXHAUST GAS TREATMENT SYSTEM FOR CONTROLLING HYDROCARBON ADSORPTION/DESORPTION IN HYDROCARBON TRAP

(71) Applicant: GM Global Technology Operations LLC, Detroit, MI (US)

(72) Inventors: Yuntao Gu, Farmington Hills, MI (US); Patrick G. Szymkowicz, Shelby Township, MI (US); Wei Li, Troy, MI (US); Calvin Thomas, Royal Oak, MI (US); Mingjie Tu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/461,807

(22) Filed: Sep. 6, 2023

(65) Prior Publication Data

US 2025/0075650 A1    Mar. 6, 2025

(51) Int. Cl.
*F01N 3/30*      (2006.01)
*B01D 53/34*      (2006.01)
(Continued)

(52) U.S. Cl.
CPC ............. *F01N 3/30* (2013.01); *B01D 53/346* (2013.01); *B01D 53/9445* (2013.01);
(Continued)

(58) Field of Classification Search
CPC .......... F01N 3/30; F01N 3/101; F01N 13/009; F01N 2240/16; F01N 2240/14;
(Continued)

(56) References Cited

U.S. PATENT DOCUMENTS 5,685,145 A * 11/1997 Sung ..................... F01N 13/009
                                         60/284
5,771,686 A * 6/1998 Pischinger ............ F02D 41/146
                                         60/276
(Continued)

FOREIGN PATENT DOCUMENTS

JP        11148344 A * 6/1999
JP        4277374 B2 * 6/2009
(Continued)

OTHER PUBLICATIONS

JP-11148344-A English Machine Translation (Year: 1999).*
(Continued)

*Primary Examiner* — Anthony Ayala Delgado
(74) *Attorney, Agent, or Firm* — CANTOR COLBURN LLP (57) ABSTRACT

An exhaust gas treatment system including: an internal combustion engine comprising an exhaust gas outlet; a first three way catalyst downstream of the exhaust gas outlet, wherein the first three way catalyst receives an exhaust output from the exhaust gas outlet; a hydrocarbon trap downstream of the first three way catalyst, wherein the hydrocarbon trap receives an exhaust output from the first three way catalyst; an exhaust heating unit downstream of the hydrocarbon trap, wherein the exhaust heating unit receives an exhaust output from the hydrocarbon trap; and a second three way catalyst downstream of the exhaust heating unit, wherein the second three way catalyst receives an exhaust output from the heating unit, wherein an air injection port is configured to selectively deliver a stream of air upstream of the hydrocarbon trap and downstream of the first three way catalyst.

14 Claims, 4 Drawing Sheets

(51) Int. Cl.
  *B01D 53/94* (2006.01)
  *F01N 3/10* (2006.01)
  *F01N 3/20* (2006.01)
  *F01N 11/00* (2006.01)
  *F01N 13/00* (2010.01)

(52) U.S. Cl.
  CPC ........... *F01N 3/101* (2013.01); *F01N 3/2013* (2013.01); *F01N 11/002* (2013.01); *F01N 11/007* (2013.01); *F01N 13/009* (2014.06); *B01D 2253/108* (2013.01); *B01D 2255/912* (2013.01); *B01D 2257/404* (2013.01); *B01D 2257/502* (2013.01); *B01D 2257/702* (2013.01); *B01D 2258/01* (2013.01); *F01N 2550/02* (2013.01)

(58) Field of Classification Search
  CPC ...... F01N 1/14; F01N 2610/03; F01N 3/0835; F01N 3/0871; F01N 3/2013; F01N 3/2006; F01N 3/20
  See application file for complete search history.

(56) References Cited

U.S. PATENT DOCUMENTS

| | | | |
|---|---|---|---|
| 6,029,441 A * | 2/2000 | Mizuno | F01N 3/0871 60/276 |
| 6,112,520 A | 9/2000 | Kaiho et al. | |
| 6,576,200 B1 * | 6/2003 | Yamamoto | B01J 23/10 422/177 |
| 7,146,802 B2 | 12/2006 | Lee | |
| 9,931,596 B2 | 4/2018 | Zheng et al. | |
| 10,753,291 B1 * | 8/2020 | Choung | F01N 11/00 |
| 11,286,838 B2 * | 3/2022 | Lupescu | F01N 11/002 |
| 2006/0201468 A1 * | 9/2006 | Lancaster | F02D 9/1055 123/179.5 |
| 2019/0353067 A1 | 11/2019 | Moser et al. | |
| 2019/0353068 A1 * | 11/2019 | Moser | F01N 3/0842 |
| 2019/0376432 A1 | 12/2019 | Paukner et al. | |
| 2020/0040784 A1 | 2/2020 | Baron Von Ceumern-Lindenstjerna et al. | |
| 2022/0065149 A1 | 3/2022 | Chen et al. | |

FOREIGN PATENT DOCUMENTS

| | | |
|---|---|---|
| JP | 2021183829 A | 12/2021 |
| KR | 102383213 B1 | 4/2022 |

OTHER PUBLICATIONS

JP-4277374-B2 English Machine Translation (Year: 2009).*
German Office Action for German Application No. 102023130369.4; dated Feb. 26, 2025, 6 pages.

* cited by examiner

EXHAUST GAS TREATMENT SYSTEM FOR CONTROLLING HYDROCARBON ADSORPTION/DESORPTION IN HYDROCARBON TRAP

INTRODUCTION

The subject disclosure relates to exhaust emission control systems for internal combustion engines and, more particularly, to the minimization of hydrocarbon emissions during the cold starting of engines.

Exhaust gas emitted from an internal combustion engine is a heterogeneous mixture that contains gaseous emissions such as carbon monoxide ("CO"), unburned hydrocarbons ("HC"), and oxides of nitrogen ("$NO_x$"). Many of these emission components are highly regulated. Catalyst components, typically disposed on catalyst supports or substrates, are provided in engine exhaust systems as part of an aftertreatment system to convert certain, or all, of these exhaust constituents into non-regulated compounds.

An exhaust gas treatment system typically includes one or more catalyst-based treatment devices, such as a three-way catalyst (TWC). The objective of a TWC is to convert the primary emissions from the engine into carbon dioxide, water, and nitrogen. For the TWC to work as an effective catalyst for hydrocarbon oxidation, it is necessary to reach a high operating temperature, which may be difficult during cold-start operations. Therefore, hydrocarbon traps (HCTs) are commonly used to store hydrocarbons during cold start and release the hydrocarbons when the TWC has reached a sufficient temperature. However, the HCT may reach a temperature at which it releases hydrocarbons before the TWC has reached sufficient temperature for catalytic oxidation of the hydrocarbon species, leading to inefficient and/or insufficient hydrocarbon oxidation.

Accordingly, it is desirable to provide sufficient time for the TWC to reach operating temperature before the bulk of hydrocarbon pollutants enter the catalytic system.

SUMMARY

An aspect provides an exhaust gas treatment system. The exhaust gas treatment system includes an internal combustion engine comprising an exhaust gas outlet. A first three way catalyst is downstream of the exhaust gas outlet, wherein the first three way catalyst receives an exhaust output from the exhaust gas outlet. A hydrocarbon trap is downstream of the first three way catalyst, wherein the hydrocarbon trap receives an exhaust output from the first three way catalyst. An exhaust heating unit is downstream of the hydrocarbon trap, wherein the exhaust heating unit receives an exhaust output from the hydrocarbon trap. A second three way catalyst is downstream of the exhaust heating unit, wherein the second three way catalyst receives an exhaust output from the heating unit, wherein an air injection port is configured to selectively deliver a stream of air upstream of the hydrocarbon trap and downstream of the first three way catalyst.

In another embodiment, the stream of air is combined with the exhaust output from the first three way catalyst.

In another embodiment, the stream of air is added to the hydrocarbon trap.

In another embodiment, the exhaust gas treatment system further includes a control unit configured to deliver the stream of air upstream of the hydrocarbon trap after the hydrocarbon trap stops absorbing hydrocarbons and before the hydrocarbon trap begins to desorb the hydrocarbons.

In another embodiment, the control unit is further configured to deliver the stream of air upstream of the hydrocarbon trap while the hydrocarbon trap desorbs the hydrocarbons.

In another embodiment, the control unit is further configured to stop delivering the stream of air upstream of the hydrocarbon trap after the hydrocarbon trap stops desorbing the hydrocarbons.

In another embodiment, the exhaust gas treatment system further includes a second sensor disposed downstream from the hydrocarbon trap and upstream from the exhaust heating unit, wherein a storage state of the hydrocarbon trap is determined using measurements from the second sensor.

In another embodiment, the stream of air is delivered at an air mass flow rate of 1 to 30 liters per second.

Another aspect provides a method for treating an exhaust gas using the exhaust gas treatment system, including operating the internal combustion engine to provide an exhaust fluid at the exhaust gas outlet. The exhaust fluid is conducted through the exhaust gas treatment system. The stream of air is selectively delivered upstream of the hydrocarbon trap and downstream of the first three way catalyst.

In an embodiment of the method, the stream of air is combined with the exhaust output from the three way catalyst.

In another embodiment of the method, the stream of air is added to the hydrocarbon trap.

In another embodiment, the method includes delivering the stream of air after the hydrocarbon trap stops absorbing hydrocarbons and before the hydrocarbon trap begins to desorb the hydrocarbons.

In another embodiment, the method further includes delivering the stream of air after the hydrocarbon trap stops absorbing hydrocarbons and while the hydrocarbon trap desorbs the hydrocarbons.

In another embodiment, the method further includes stopping the delivering of the stream of air after the hydrocarbon trap stops desorbing the hydrocarbons.

In another embodiment, the method further includes measuring a temperature, a gas concentration, a pressure, or a combination thereof using a first sensor disposed upstream from the hydrocarbon trap and downstream from the first three way catalyst. The stream of air is selectively delivered based on the measurement of the first sensor, wherein the stream of air is delivered after the hydrocarbon trap stops absorbing hydrocarbons and before the hydrocarbon trap begins to desorb the hydrocarbons.

In another embodiment, the method further includes selectively delivering the stream of air based on timing of an engine event, wherein the stream of air is delivered after the hydrocarbon trap stops absorbing hydrocarbons and before the hydrocarbon trap begins to desorb the hydrocarbons.

In another embodiment, the method further includes delivering the stream of air while the hydrocarbon trap desorbs the hydrocarbons.

In another embodiment, the method further includes measuring a temperature, a gas concentration, a pressure, or a combination thereof using a second sensor disposed downstream from the hydrocarbon trap and upstream from the exhaust heating unit. The stream of air is selectively delivered based on the measurement of the second sensor, wherein the stream of air is delivered after the hydrocarbon trap stops absorbing hydrocarbons and before the hydrocarbon trap begins to desorb the hydrocarbons.

In another embodiment, the method further includes delivering the stream of air while the hydrocarbon trap desorbs the hydrocarbons.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

For cold start hydrocarbon (HC) control, hydrocarbon traps (HCTs), such as those utilizing zeolites as hydrocarbon trapping components, have been investigated. In these systems, the molecular sieve zeolite component adsorbs and stores hydrocarbons during the start-up period and rapidly releases the stored hydrocarbons when the exhaust temperature is high enough to desorb hydrocarbons. The desorbed hydrocarbons are subsequently converted by a three way catalyst (TWC) component downstream of the HCT. However, during a cold start, the HCTs may reach the hydrocarbon desorption (release) temperature before the TWC has reached a suitable temperature for HC oxidation, even when an exhaust heater (EH) is used to heat the TWC. As disclosed herein, the injection of air after a first three-way catalyst and before a hydrocarbon trap according to a particular timing schedule provides a cooling effect on the HCT to delay the release of the hydrocarbons from the HCT, which allows for additional time for the EH to heat the TWC to a suitable operational temperature for hydrocarbon oxidation. The cooling effect of the injection of air before the HCT also may serve to maximize a temperature difference between the HCT and the TWC, thereby improving hydrocarbon oxidation efficiency.

The internal combustion engine generally represents any device capable of generating an exhaust gas stream comprising gaseous (e.g., $NO_x$, $CO_x$, $O_2$) and/or particulate matter species, and the disclosure herein should accordingly be interpreted as applicable to all such devices. As used herein, "exhaust gas" refers to any chemical species or mixture of chemical species which may require treatment, and includes gaseous, liquid, and/or solid species. For example, an exhaust gas stream may contain a mixture of one or more $NO_x$ species, one or more liquid hydrocarbon (HC) species, carbon dioxide, and/or carbon monoxide. It should be further understood that the embodiments disclosed herein may be applicable to treatment of effluent streams not comprising carbonaceous and/or particulate matter species. Exhaust gas particulate matter generally includes carbonaceous soot and other solid and/or liquid carbon-containing species.

Figure 1:
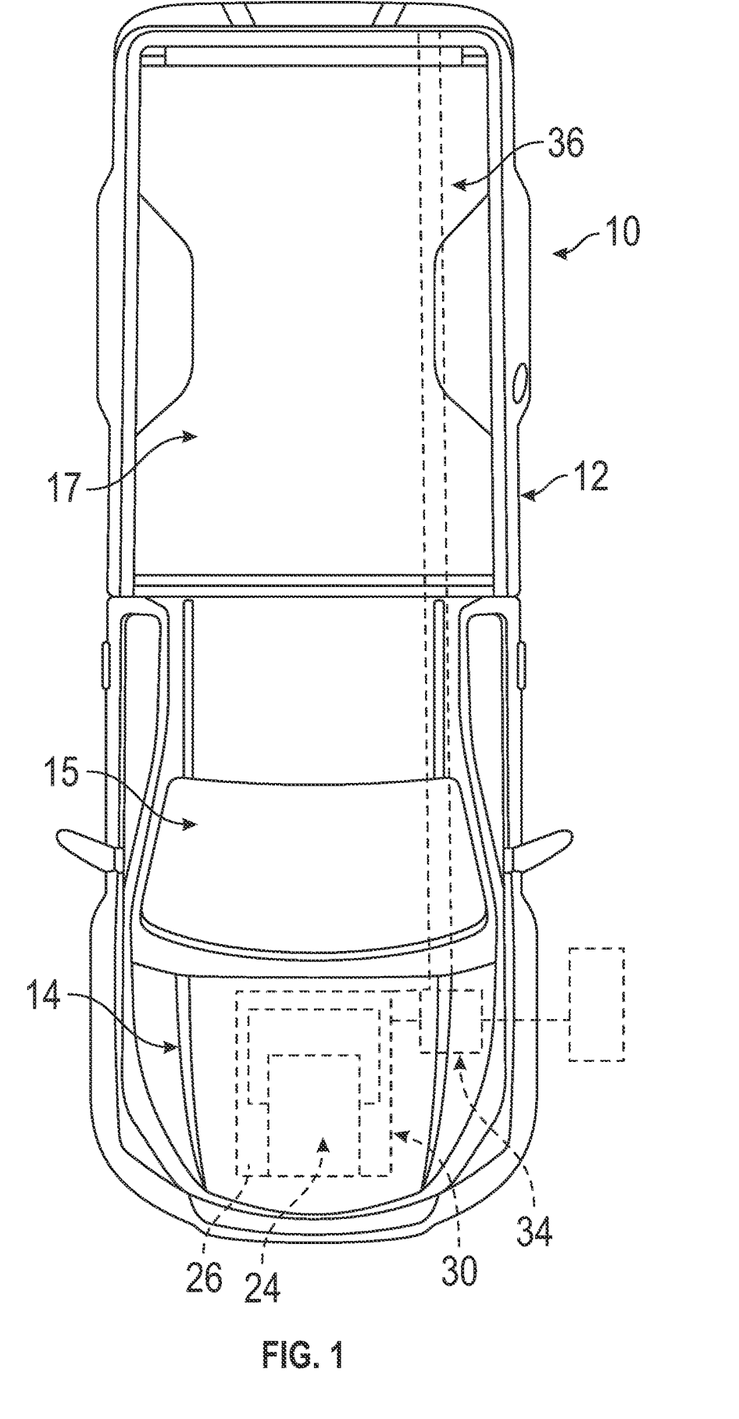
FIG. 1 illustrates a motor vehicle including an internal combustion engine and an emission control system according to one or more embodiments.

In accordance with an exemplary embodiment an exhaust gas treatment system for a motor vehicle is provided. In FIG. 1, a motor vehicle 10 is shown in the form of a pickup truck. It is to be understood that motor vehicle 10 may take on various forms including automobiles, commercial transports, marine vehicles, or the like. The motor vehicle 10 includes a body 12 having an engine compartment 14, and optionally a passenger compartment 15 and/or a cargo bed 17. Engine compartment 14 houses an internal combustion engine 24. The internal combustion engine 24 includes an exhaust system 30 that is fluidically connected to an exhaust gas treatment system 34. The internal combustion engine 24 may also be connected to other engine components 26. The exhaust produced by the internal combustion engine 24 passes through the exhaust gas treatment system 34 to reduce and/or convert emissions that may exit to the ambient atmosphere through an exhaust outlet pipe 36.

While the internal combustion engine 24 shown in FIG. 1 is shown as a sole main power source of the vehicle 10, it can also represent a second main engine source used together with another main power source as in a hybrid's electric motor.

Figure 2:
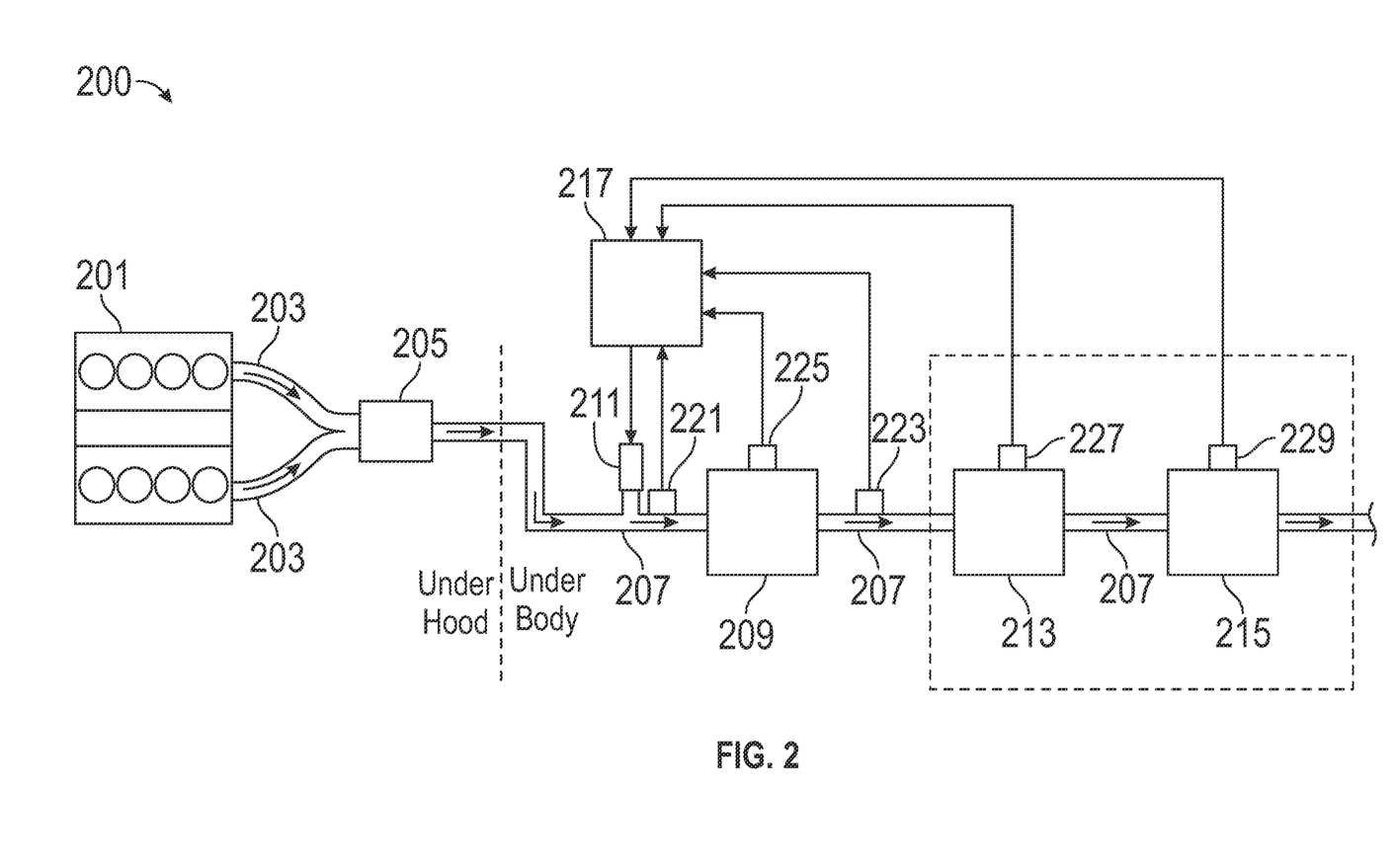
FIG. 2 is a schematic plan view of an exhaust gas treatment system according to one or more embodiments.

According to an aspect, and as shown in FIG. 2, provided is an exhaust gas treatment system 200 that includes an internal combustion engine 201 comprising an exhaust gas outlet 203, wherein the internal combustion engine 201 delivers an exhaust gas stream via the exhaust gas outlet 203. The internal combustion engine 201 may include one or more exhaust gas outlets 203. For example, FIG. 2 shows a pair of exhaust gas outlets 203 conduct combustion gases from the internal combustion engine 201.

A first three way catalyst (first TWC) 205 is provided downstream of the exhaust gas outlet 203. The first TWC 205 is in fluid communication with the exhaust gas outlet 203 to receive an exhaust output (exhaust gas stream) from the exhaust gas outlet 203 of the internal combustion engine 201.

The first TWC 205 can be one of various flow-through catalyst devices capable of oxidizing CO and HCs as well as reducing $NO_x$. In some embodiments, the first TWC 205 may include a flow-through metal or ceramic monolith substrate. The substrate may be packaged in a stainless steel shell or canister having an inlet in fluid communication with the exhaust gas outlet 203 and an outlet in fluid communication with an exhaust gas conduit 207. The substrate can include a catalyst compound disposed thereon. The catalyst compound may be applied as a washcoat and may contain platinum group metals such as platinum (Pt), palladium (Pd), rhodium (Rh), or other suitable oxidizing catalysts, or a combination thereof. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the first TWC 205, the catalyst compositions for the oxidation and reduction functions can reside in discrete washcoat layers on the substrate or, alternatively, the compositions for the oxidation and reduction functions can reside in discrete longitudinal zones on the substrate.

The exhaust gas treatment system 200 includes a hydrocarbon trap (HCT) 209 located downstream of the first TWC 205. The HCT 209 is in fluid communication with and receives an exhaust output from the first TWC 205. For example, as noted above, the first TWC 205 may be in fluid communication with the HCT 209 via a segment of the exhaust gas conduit 207.

Suitable HCT storage materials for hydrocarbons include micro-porous solids, so-called molecular sieves, with zeolitic material representing a suitable micro-porous solid for HC trapping. Storage materials such as zeolitic (or zeotype) materials have a porosity suitable for storing or capturing hydrocarbons at least until a desired desorption temperature is reached. That is, the hydrocarbons are adsorbed while the exhaust gas is cold (for example during a cold start) and are desorbed when a higher exhaust-gas temperature is reached. Zeolites are microporous crystalline aluminosilicate materials characterized by well-ordered 3D structures with uniform pore/channel/cage structures of, for example, 3 to 12 Å or 3 to 10 Å (depending on framework type) and the ability to undergo ion exchange to enable the dispersion of catalytically active cations throughout the structure. Zeotypes are structural isotypes/isomorphs of zeolites and instead of a framework structure derived of linked silica and alumina tetrahedra, zeotypes are based upon, for example, alumina-phosphate (ALPO), silica-alumina-phosphate (SAPO), metal-alumina-phosphate (M-ALPO), or metal-silica-alumina-phosphate (M-APSO). Exemplary zeolitic materials include, for example, mordenite (MOR), Y-zeolites (FAU), ZSM-5 (MFI), β-zeolites (BEA), or combinations thereof. These are preferably used in H-form or $NH_4$-form being exchanged with transition metals.

The exhaust gas treatment system 200 includes an exhaust heating unit 213 located downstream of the HCT 209. The exhaust heating unit 213 is in fluid communication with and receives an exhaust output from the HCT 209. For example, as noted above, the exhaust heating unit 213 may be in fluid communication with the HCT 209 via a segment of the exhaust gas conduit 207. Any suitable exhaust heating unit 213 may be used. For example, the exhaust heating unit 213 may be an electrical heater. If the vehicle is a conventional vehicle powered only by the internal combustion engine 201, then the exhaust heating unit 213 is powered by the engine 201 post-crank (i.e., post-crank heating after the engine 201 has started). If the vehicle is a hybrid vehicle powered by either the internal combustion engine 201 and/or a separate ICE/electric motor combination (not shown), then the exhaust heating unit 213 may be powered by either the engine 201 or the ICE/electric motor combination.

The exhaust gas treatment system 200 includes a second three way catalyst (second TWC) 215 located downstream of the exhaust heating unit 213. The second TWC 215 is in fluid communication with and receives an exhaust output from the exhaust heating unit 213. For example, as noted above, the second TWC 215 may be in fluid communication with the exhaust heating unit 213 via a segment of the exhaust gas conduit 207. The second TWC 215 can be one of various flow-through catalyst devices capable of oxidizing CO and HCs as well as reducing $NO_x$, and any suitable three way catalyst may be used, such as those described above for the first TWC 205.

The exhaust gas treatment system 200 includes an air injection port 211 that is configured to selectively deliver a stream of air upstream of the HCT 209 and downstream of the first TWC 205. The location of the air injection port 211 is not particularly limited. In some embodiments, the stream of air may be combined with the exhaust output from the first TWC 205 at a location that is proximate to the outlet of the first TWC 205. In other embodiments, the air injection port 211 may be located proximate to the inlet of the HCT 209.

The air injection source may be provided by an auxiliary pump, or may be tapped from the engine's compressor, with a valve and/or a choke nozzle. For vehicles with a turbocharger, the boost pressure and turbocharged air may be used as the source. In other embodiments, the air source may be from the crankcase using the energy generated therein to provide the air injection. In some embodiments, the air source may be a supercharger compressor or another air pumping device included with the engine.

In one or more embodiments, the exhaust gas treatment system 200 may further include a control unit 217 configured to deliver the stream of air upstream of the HCT 209 after the HCT 209 stops absorbing or capturing hydrocarbons and before the HCT 209 begins to desorb or release the hydrocarbons. In some embodiments, the control unit 217 may be configured to deliver the stream of air upstream of the HCT 209 while the HCT 209 desorbs the hydrocarbons. For example, in one or more embodiments, the control unit 217 may be configured to deliver the stream of air upstream of the HCT 209 after the HCT 209 stops absorbing hydrocarbons and while the HCT 209 desorbs the hydrocarbons.

In some embodiments, the control unit 217 may be operably connected, via a number of sensors, to monitor the exhaust gas treatment system 200. The control unit may include a control module (not shown). As used herein, the term module refers to an application specific integrated circuit (ASIC), an electronic circuit, a processor (shared, dedicated, or group), and memory that executes one or more software or firmware programs, a combinational logic circuit, and/or other suitable components that provide the described functionality. Exemplary sensors include hydrocarbon sensors, oxygen sensors, temperature sensors, pressure sensors, or the like, or a combination thereof. The signal generated by a sensor can be transmitted to the control unit 217, and can be interpreted by the control unit 217 as needed for operation of the exhaust gas treatment system 200.

In some embodiments, the exhaust gas treatment system 200 may include a first sensor 221 that is disposed upstream from the HCT 209 and downstream from the first TWC 205. The first sensor 221 may be used, for example, to measure a concentration of one or more gases (e.g., oxygen, carbon dioxide, hydrocarbons, or the like, or a combination thereof) that are present in the exhaust gas conduit 207. The first sensor 221 may be used, for example, to measure a temperature and/or a pressure that is present in the exhaust gas conduit 207. For example, the first sensor 221 may be located proximate to the inlet of the HCT 209 to determine a concentration of gases, a temperature, and/or a pressure at the inlet of the HCT 209.

In some embodiments, the exhaust gas treatment system 200 may include a second sensor 223 that is disposed downstream from the HCT 209 and upstream from the exhaust heating unit 213. The second sensor 223 may be used, for example, to measure a concentration of one or more gases (e.g., oxygen, carbon dioxide, hydrocarbons, or the like, or a combination thereof) that are present in the exhaust gas conduit 207. The second sensor 223 may be used, for example, to measure a temperature and/or a pressure that is present in the exhaust gas conduit 207. For example, the second sensor 223 may be located proximate to the outlet of the HCT 209 to determine a concentration of gases, a temperature, and/or a pressure at the outlet of the HCT 209.

The control unit 217 may be used to evaluate or determine a storage state of the HCT 209 based on the parameters that are measured (e.g., concentrations of gases, temperature, and/or pressure), where the storage state is as defined herein. For example, in some embodiments, the storage state may be determined by comparing the concentrations of gases, temperature, and/or pressure at the inlet of the HCT 209 to the concentrations of gases, temperature, and/or pressure at the outlet of the HCT 209. In some embodiments, the storage state of the HCT 209 may be determined based on timing of an engine event, such as the time elapsed from a cold start of an engine, or the like.

The control unit 217 may be used to evaluate or determine a storage state of the HCT 209 based on the data measured by the first sensor 221 and/or the second sensor 223. In some embodiments, the control unit 217 may be used to evaluate or determine the storage state of the HCT 209 based on timing of an engine event, such as the time elapsed from a cold start of an engine, or the like. As used herein, the term "storage state" refers to the state of the hydrocarbon trap and may be an active state, an inactive state, or a release state. The term "active state" indicates that hydrocarbons are being stored (e.g., adsorbed) in the HCT 209, the term "release state" indicates that hydrocarbons are being released from the HCT 209, and the term "inactive state" indicates that the hydrocarbons are neither being stored nor being released at the HCT 209. For example, the active state may be indicated when the concentration of hydrocarbons at the inlet of the HCT 209 is determined to be greater than a concentration of hydrocarbons at an outlet of the HCT 209, the release state may be indicated when the concentration of hydrocarbons at the outlet of the HCT 209 is determined to be greater than the concentration of hydrocarbons at the inlet of the HCT 209, and the inactive state may be indicated when the concentration of hydrocarbons at the inlet of the HCT 209 is determined to be substantially the same as the concentration of hydrocarbons at the outlet of the HCT 209. The storage stage may be determined by using any number of parameters, such as gas concentrations, time, pressure, and/or temperature. However, embodiments are not limited thereto, and the storage state of the HCT 209 may be evaluated using one or more sensors described herein or by other methods.

Additionally, one or more sensors may also be located in the various components of the exhaust gas treatment system 200. In some embodiments, the one or more sensors may include one or more temperature sensors 225, 227, 229 that are in contact with the components of the exhaust gas treatment system 200. For example, the exhaust gas treatment system 200 may include a first temperature sensor 225 that is configured to measure the temperature of the HCT 209, a second temperature sensor 227 that is configured to measure the temperature of the exhaust heating unit 213, and/or a third temperature sensor 229 that is configured to measure the temperature of the second TWC 215. In some embodiments, a temperature signal generated by a temperature sensor can be transmitted to the control unit 217, and can be interpreted by the control unit 217 as needed for operation of the exhaust gas treatment system 200. The temperature sensors may be in fluid communication with the exhaust gas within the respective components, and/or may be a measurement of the component temperatures.

As noted above, the exhaust gas treatment system 200 can include an exhaust gas conduit 207, which may comprise several segments, for transporting the exhaust gas from the internal combustion engine 201 to the various exhaust treatment devices of the exhaust gas treatment system 200. For example, as illustrated, in FIG. 2, the exhaust gas treatment system 200 includes segments of an exhaust gas conduit 207 that fluidly connects the first TWC 205, the HCT 209, the exhaust heating unit 213, and the second TWC 215. The outlet of the second TWC 215 may include a tailpipe that vents the treated exhaust gas to the ambient atmosphere.

Another aspect provides a method for treating an exhaust gas using the exhaust gas treatment system 200. The method includes operating the internal combustion engine 201 to provide an exhaust fluid (e.g., an exhaust gas stream) at the exhaust gas outlet 203. The exhaust fluid is conducted or transported through the exhaust gas treatment system 200, and through the first TWC 205, the HCT 209, the exhaust heating unit 213, and the second TWC 215. The stream of air is selectively delivered upstream of the HCT 209 and downstream of the first TWC 205.

The stream of air is injected via the air injection port 211, as described herein. For example, the stream of air may be combined with the exhaust output from the first TWC 205 at a location that is proximate to the outlet of the first TWC 205. In other embodiments, the air injection port 211 may be located proximate to the inlet of the HCT 209.

In some embodiments, the method may include delivering the stream of air after the HCT 209 stops absorbing hydrocarbons and before the HCT 209 begins to desorb the hydrocarbons. In some embodiments, the method may include delivering the stream of air after the HCT 209 stops absorbing hydrocarbons and while the HCT 209 desorbs the hydrocarbons. In some aspects, the method may further include stopping the delivering of the stream of air after the HCT 209 stops desorbing the hydrocarbons.

The method may include measuring a temperature, a gas concentration, a pressure, or a combination thereof using a first sensor 221 that is disposed upstream from the HCT 209 and downstream from the first TWC 205, and selectively delivering the stream of air based on the measurement of the first sensor 221, as described herein. The stream of air may be selectively delivered after the HCT 209 stops absorbing hydrocarbons and before the HCT 209 begins to desorb the hydrocarbons. In some aspects, the stream of air may be further selectively delivered while the hydrocarbons are release from the HCT 209.

In some embodiments, the method can further include selectively delivering the stream of air based on timing of an engine event, wherein the stream of air is delivered after the hydrocarbon trap stops absorbing hydrocarbons and before the hydrocarbon trap begins to desorb the hydrocarbons. For example, the engine event may be measured from the cold start of an engine.

In some embodiments, the method can further include measuring a temperature, a gas concentration, a pressure, or a combination thereof using a second sensor 223 that is disposed downstream from the HCT 209 and upstream from the exhaust heating unit (HER) 213; and selectively delivering the stream of air based on the measurement of the second sensor 223, wherein the stream of air may be selectively delivered after the HCT 209 stops absorbing hydrocarbons and before the HCT 209 begins to desorb the hydrocarbons. In some aspects, the stream of air may be further selectively delivered while the hydrocarbons are release from the HCT 209.

In some embodiments, the stream of air may be delivered at any suitable air mass flow rate. For example, the stream of air may be delivered at an air mass flow rate sufficient to provide a suitable temperature differential between a hydrocarbon release temperature at the HCT 209 and a hydrocarbon oxidation temperature at the TWC 215. As used herein, the term "hydrocarbon release temperature" refers to a temperature at which hydrocarbons are released (e.g., desorbed) from the HCT 209. As used herein, the term "hydrocarbon oxidation temperature" refers to a temperature at which hydrocarbons are oxidized at the TWC 215.

In one or more embodiments, the stream of air may be delivered at an air mass flow rate of 1 to 30 liters per second (L/s). For example, the stream of air may be delivered at an air mass flow rate of 2.5 to 30 L/s, or 5 to 25 L/s, but embodiments are not limited thereto. In some embodiments, the stream of air is delivered at an air mass flow rate sufficient to provide a suitable temperature differential, wherein the temperature differential is a difference between a temperature of the HCT 209 and a temperature of the second TWC 215. In some embodiments, the stream of air is delivered at an air mass flow rate sufficient to provide a suitable temperature differential, wherein the temperature differential is a difference between a temperature of the HCT 209 and a temperature of the exhaust heating unit 213. In some embodiments, a method is provided for selecting the HCT material and selecting the TWC material to maximize the temperature differential.

In some embodiments, the stream of air may be delivered at an air mass flow rate sufficient to provide a temperature differential of at least 10° C., at least 25° C., at least 50° C., at least 100° C., at least 150° C., at least 180° C., or at least 200° C., wherein the temperature differential is a difference between a temperature of the HCT 209 and a temperature of the second TWC 215. In some embodiments, the stream of air may be delivered at an air mass flow rate sufficient to provide a temperature differential, of at least 10° C., at least 25° C., at least 50° C., at least 100° C., at least 150° C., at least 180° C., or at least 200° C., wherein the temperature differential is a difference between a temperature of the HCT 209 and a temperature of the exhaust heating unit 213.

Figure 3:
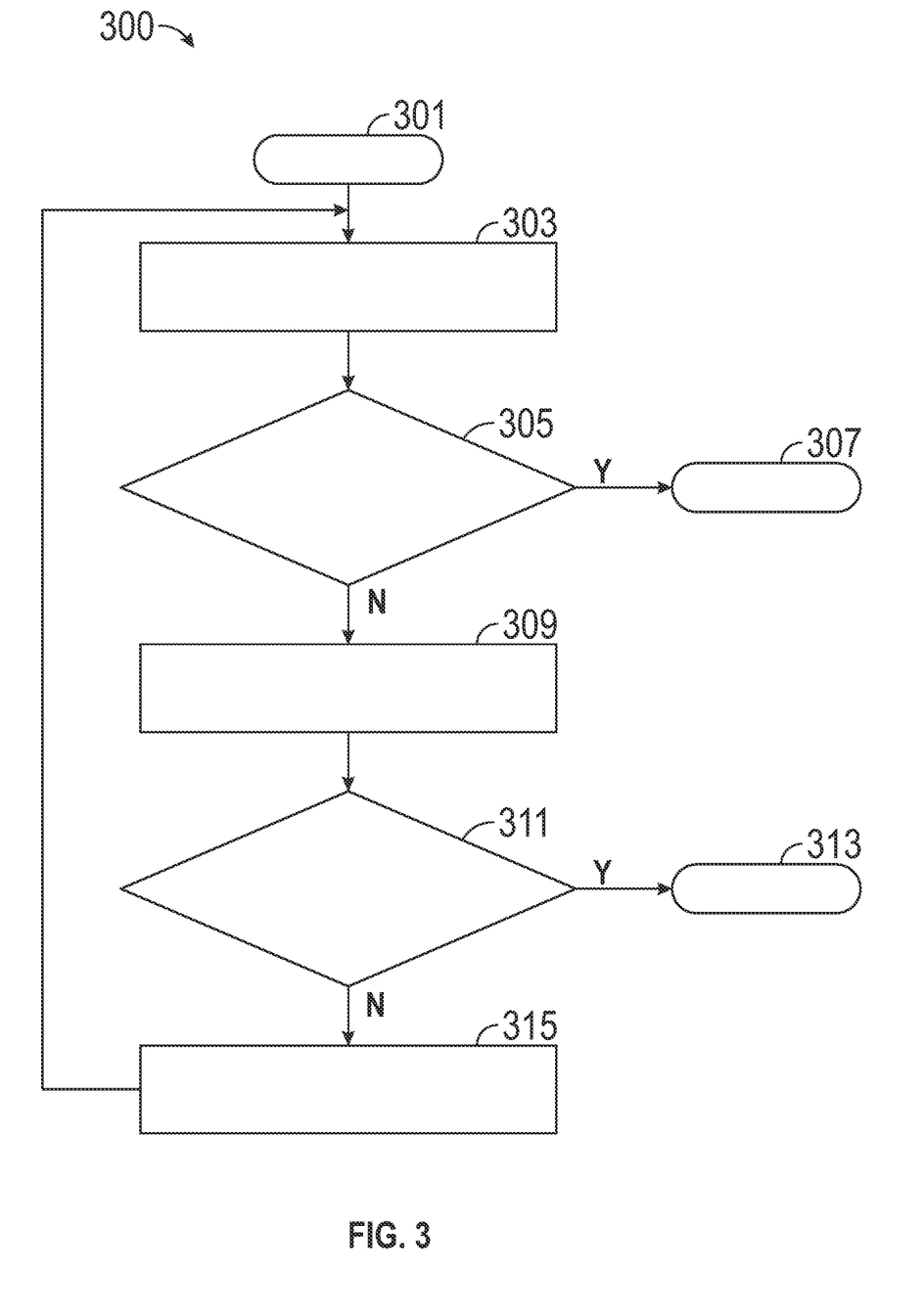
FIG. 3 illustrates a flowchart of an illustrative method according to one or more embodiments.

FIG. 3 depicts a flow diagram 300 illustrating a method for treating an exhaust gas from an internal combustion engine according to one or more embodiments. The flow diagram begins in block 301, which directs to block 303, where the hydrocarbon absorption amount is estimated. As shown in block 305, a determination is made if hydrocarbons are being absorbed. If the hydrocarbons are being absorbed, then proceed to block 307, where the air injection is stopped. If the hydrocarbons are not being absorbed, then proceed to block 309, while keeping the air injection on. As described herein, the evaluation of hydrocarbons being absorbed may be determined based on one or more parameters such as time, gas concentrations, temperature, and/or pressure as measured upstream and/or downstream of the hydrocarbon trap (or other locations) using one or more sensors.

As shown in block 309, an estimate of the hydrocarbon inventory and the desorption rate are determined. In block 311, a determination is made if hydrocarbon desorption has ended. If the hydrocarbon absorption has ended, then proceed to block 313, where the air injection is stopped. If the hydrocarbon desorption has not ended, then proceed to block 315, while keeping the air injection on. As described herein, the evaluation of hydrocarbons being desorbed may be determined based on one or more parameters such as time, gas concentrations, temperature, and/or pressure as measured upstream and/or downstream of the hydrocarbon trap (or other locations) using one or more sensors. Similarly, the evaluation of hydrocarbon inventory may be determined based on one or more parameters such as time, gas concentrations, temperature, and/or pressure as measured upstream and/or downstream of the hydrocarbon trap (or other locations) using one or more sensors.

Figure 4:
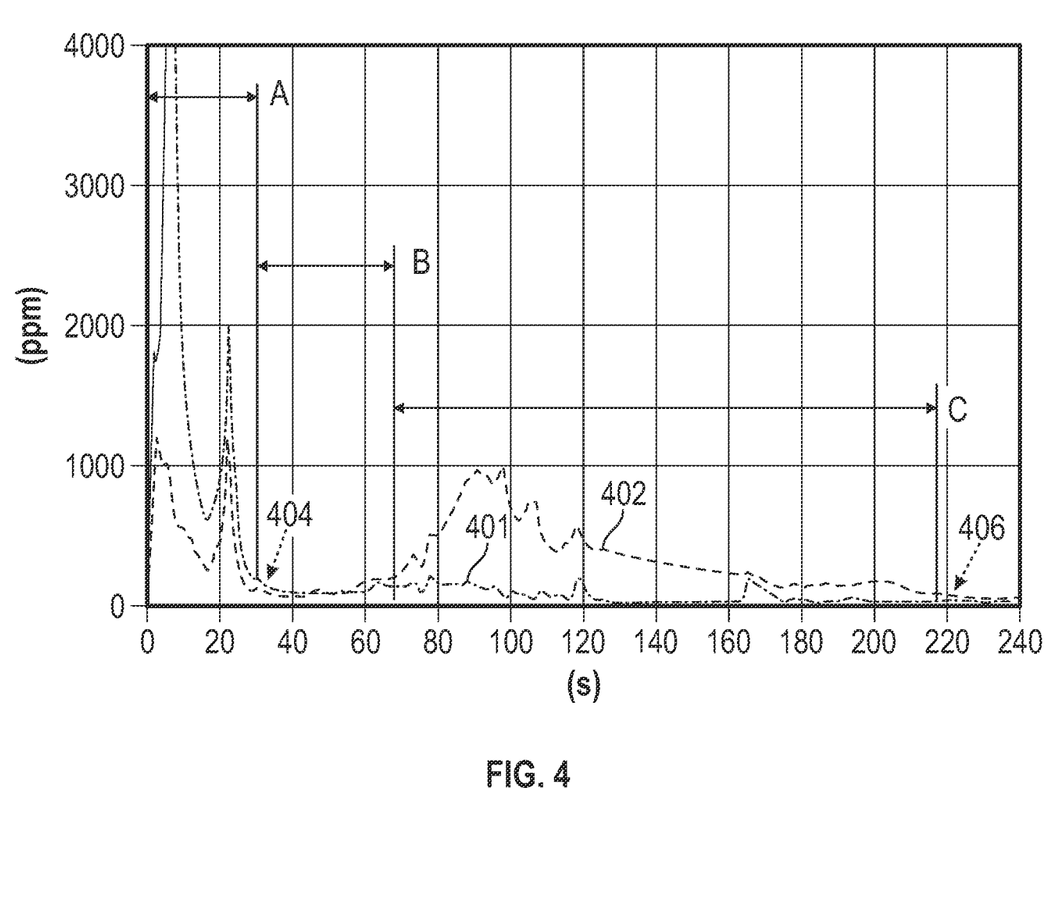
FIG. 4. is a graph of hydrocarbon (HC) concentration (parts per million, ppm) versus time (seconds, s) as measured at the inlet of a hydrocarbon trap and at the outlet of a hydrocarbon trap according to one or more embodiments.

Referring now to FIG. 4, a graph illustrates the hydrocarbon concentrations measured at the inlet of an HCT 401 and at the outlet of an HCT 402 based on time from engine start. During the period from a time of 0 second(s) to about 30 s, which is labeled as "HCT Storage Period" (A), hydrocarbons were being stored in the HCT unit while the air injection would remain off. At a time of about 30 s, the hydrocarbon storage by the HCT unit was completed and the air injection may begin upstream of the HCT unit and downstream of the first TWC, which is labeled as "Inactive Period-No HC Storage or Release" (B). Near 70 s, the HCT unit may reach a temperature where the hydrocarbons begin to desorb and release from the HCT outlet, which is labeled as "HCT Release Period" (C). Subsequently, at about 220 s the hydrocarbons have been released from the HCT unit and the air injection may be stopped. The start of the air injection is labeled 404 ("On") and the stopping of the air injection is labeled 406 ("Off") in FIG. 4.

The technical methods described herein facilitate improvements to emissions control systems used in combustion engines, such as those used in vehicles. The technical features described herein improve the conventional emissions control system by providing a control scheme based on capture and release of hydrocarbons by the hydrocarbon trap. Advantageously, the control scheme lowers emissions during cold starts.

In terms of hardware architecture, the emissions control system can be implemented in part using a computing device that can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

One should note that FIG. 3 shows an architecture, functionality, and/or operation scheme that can be implemented in part using software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terms "a" and "an" do not denote a limitation of quantity, but rather denote the presence of at least one of the referenced items. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears. Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure is not limited to the particular embodiments disclosed, but will include all embodiments falling within the scope thereof.

What is claimed is:

1. An exhaust gas treatment system, comprising:
   an internal combustion engine comprising an exhaust gas outlet;
   a first three way catalyst downstream of the exhaust gas outlet, wherein the first three way catalyst receives an exhaust output from the exhaust gas outlet;
   a hydrocarbon trap downstream of the first three way catalyst, wherein the hydrocarbon trap receives an exhaust output from the first three way catalyst;
   an exhaust heating unit downstream of the hydrocarbon trap, wherein the exhaust heating unit receives an exhaust output from the hydrocarbon trap; and
   a second three way catalyst downstream of the exhaust heating unit, wherein the second three way catalyst receives an exhaust output from the heating unit,
   wherein an air injection port is configured to selectively deliver a stream of air upstream of the hydrocarbon trap and downstream of the first three way catalyst, and
   a control unit configured to deliver the stream of air upstream of the hydrocarbon trap after the hydrocarbon trap stops absorbing hydrocarbons, before the hydrocarbon trap begins to desorb the hydrocarbons, and while the hydrocarbon trap desorbs the hydrocarbons.

2. The exhaust gas treatment system of claim 1, wherein the stream of air is combined with the exhaust output from the first three way catalyst.

3. The exhaust gas treatment system of claim 1, wherein the stream of air is added to the hydrocarbon trap.

4. The exhaust gas treatment system of claim 1, wherein the control unit is further configured to stop delivering the stream of air upstream of the hydrocarbon trap after the hydrocarbon trap stops desorbing the hydrocarbons.

5. The exhaust gas treatment system of claim 1, further comprising a first sensor disposed upstream from the hydrocarbon trap and downstream from the first three way catalyst, wherein a storage state of the hydrocarbon trap is determined using measurements from the first sensor.

6. The exhaust gas treatment system of claim 1, further comprising a second sensor disposed downstream from the hydrocarbon trap and upstream from the exhaust heating unit, wherein a storage state of the hydrocarbon trap is determined using measurements from the second sensor.

7. The exhaust gas treatment system of claim 1, wherein the stream of air is delivered at an air mass flow rate of 1 to 30 liters per second.

8. A method for treating an exhaust gas using the exhaust gas treatment system of claim 1, the method comprising:
   operating the internal combustion engine to provide an exhaust fluid at the exhaust gas outlet;
   conducting the exhaust fluid through the exhaust gas treatment system; and
   selectively delivering the stream of air upstream of the hydrocarbon trap and downstream of the first three way catalyst,
   delivering the stream of air after the hydrocarbon trap stops absorbing hydrocarbons, before the hydrocarbon trap begins to desorb the hydrocarbons, and while the hydrocarbon trap desorbs the hydrocarbons.

9. The method of claim 8, wherein the stream of air is combined with the exhaust output from the three way catalyst.

10. The method of claim 8, wherein the stream of air is added to the hydrocarbon trap.

11. The method of claim 8, further comprising stopping the delivering of the stream of air after the hydrocarbon trap stops desorbing the hydrocarbons.

12. The method of claim 8, further comprising:
   measuring a temperature, a gas concentration, a pressure, or a combination thereof using a first sensor disposed upstream from the hydrocarbon trap and downstream from the first three way catalyst; and
   selectively delivering the stream of air based on the measurement of the first sensor,
   wherein the stream of air is delivered after the hydrocarbon trap stops absorbing hydrocarbons and before the hydrocarbon trap begins to desorb the hydrocarbons.

13. The method of claim 8, further comprising:
   selectively delivering the stream of air based on timing of an engine event.

14. The method of claim 8, further comprising
   measuring a temperature, a gas concentration, a pressure, or a combination thereof using a second sensor disposed downstream from the hydrocarbon trap and upstream from the exhaust heating unit; and
   selectively delivering the stream of air based on the measurement of the second sensor.

* * * * *